Apr. 3, 1923.
L. A. MUELLER
TRAP DRUM SUPPORT
Filed May 10, 1920
1,450,732
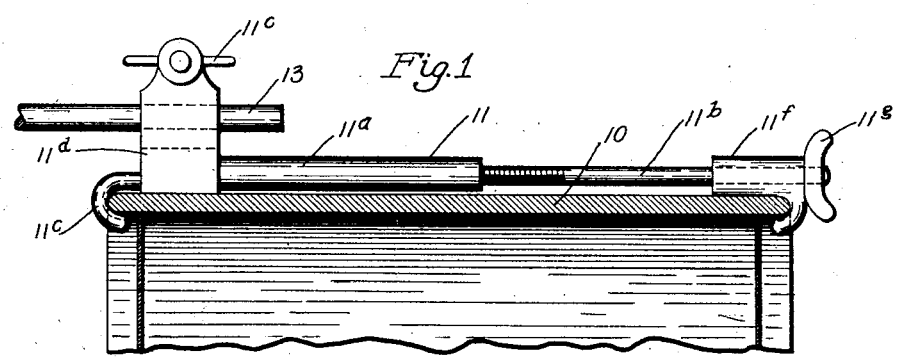
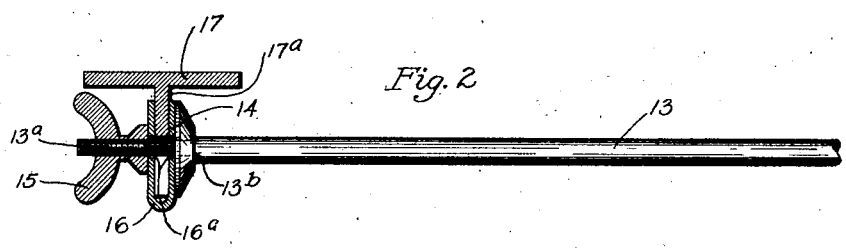
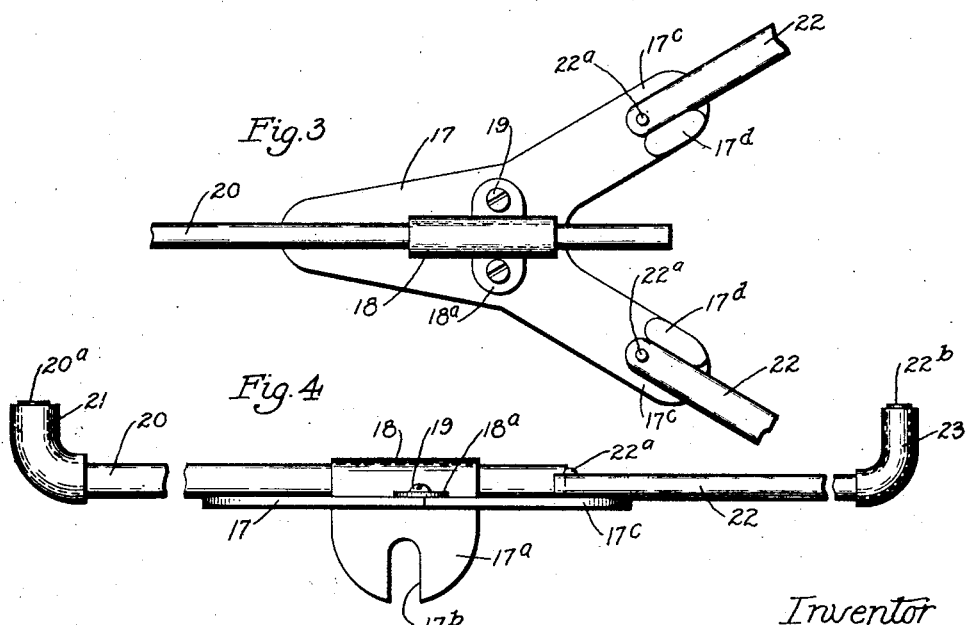
Inventor
Lawrence A. Mueller
By Sheridan, Jones, Sheridan & Smith.
attys.

Patented Apr. 3, 1923.

1,450,732

UNITED STATES PATENT OFFICE.

LAWRENCE A. MUELLER, OF KANKAKEE, ILLINOIS.

TRAP-DRUM SUPPORT.

Application filed May 10, 1920. Serial No. 380,301.

*To all whom it may concern:*

Be it known that I, LAWRENCE A. MUELLER, a citizen of the United States, residing at Kankakee, in the county of Kankakee and State of Illinois, have invented certain new and useful Improvements in Trap-Drum Supports, of which the following is a specification.

This invention relates to improvements in trap drum supports and has for its object to provide means to attach a snare drum directly to the base drum, with which it is ordinarily used, in such position that it may be readily placed and adjusted, as desired.

These and other objects will be more fully set forth and described in the following specification and shown in the accompanying drawing in which—

Figure 1 is a side elevation of a portion of a drum supporting device shown as attached to a portion of a base drum, the latter being in section.

Fig. 2 is an extended view of a portion of the mechanism shown in Fig. 1.

Fig. 3 is a plan view of a section of the apparatus.

Fig. 4 is a side elevation of a portion of the apparatus, as shown in Fig. 3.

Like numerals refer to like elements throughout the drawings, in which 10 indicates generally the cylindrical portion of a base drum, not forming a part of this invention, and shown more or less diagrammatically and without the customary hoops, tension members, &c. for convenience.

Indicated generally at 11 is a clamping rod comprising the tubular internally threaded portion $11^a$ in which is threaded the rod $11^b$. The tube $11^a$ is formed with or carries the hooked extremity $11^c$ and the upwardly projecting clamp $11^d$, which is split and apertured to engage the rod 13, see Fig. 1. This rod 13 may be secured in any extended position by adjustment of the wing nut $11^e$, which serves to clamp the rod 13 in the clamp $11^d$ in the customary manner. Slidably mounted upon the rod $11^b$ is the hook $11^f$. The rod $11^b$ terminates in the winged head $11^g$, the rotation of which in the proper direction will advance the rod $11^b$ into the tube $11^a$ thereby bringing the hook members $11^c$, $11^f$ into clamping engagement with the hoops or cylindrical portion of the base drum 10. At one end the rod 13 is reduced and threaded, as indicated by numeral $13^a$, see Fig. 2. Slidably mounted upon this threaded portion $13^a$ is the ring or collar 14 abutting against the shoulder $13^b$ of the rod 13. Threadedly engaging the portion $13^a$ of the rod is the wing nut 15. Between the wing nut 15 and the collar 14 is located the U-shaped washer 16 having the apertures $16^a$ therein to slide over the threaded portion $13^a$. Between the portions of the washer 16 is mounted the depending flange $17^a$ of the bracket 17, see Figs. 2–4, for example, said flange being secured to said bracket by solder or by other means. This flange is provided with a downwardly extending slot $17^b$, see Fig. 4, which fits over the threaded portion $13^a$ of the rod 13. It will be obvious that the wing nut 15 may be rotated to clamp the bracket 17, flange $17^a$ between the portions of the washer 16, the collars 14 serving as a detachable head for the rod 13. A slight reverse rotation of the wing nut 15 will release the frictional engagement upon the flange $17^a$ permitting adjustment of the bracket 17 in any desired position, after which clamping action may be reinstated.

On its upper face the bracket 17 is provided with the sleeve portion 18 normally open at the bottom and provided with the flanges $18^a$ through which extend the screws 19. A rod 20 extends through the sleeve 18 between the same and the top of the bracket 17 and is extensible as desired, being flattened to prevent rotation and being frictionally gripped by the sleeve 18, this frictional grip being adjustable by means of the screws 19. At its upper end the rod 20 is provided with the upturned portion $20^a$ preferably sheathed with rubber 21 or the like for the purpose of engagement with the snare or trap drum to insure proper gripping without injury to the drum. The bracket 17 is provided with the diverging and outwardly extending arm portion $17^c$ upon each of which is mounted a flattened rod 22 pivoted throughout at $22^a$, these rods being similarly provided with upturned extremities $22^b$ sheathed in rubber 23, or the like. Lugs $17^d$ project upwardly from the top of the bracket arms $17^c$ and serve as stops for the rods 22 when the latter are in engaging position.

When it is desired to attach the trap drum to the base drum, the clamping member 11 is engaged with the drum as described above and the rod 13 extended to desired position and clamped in such position by means of the clamp 11<sup>d</sup>. The rods 22 are swung out to position shown in Figs. 2 and 4 and the rod 20 is drawn out to permit seating of the drum on it as well as rods 22, after which the rod 22 is pushed inwardly to position wherein the drum will be engaged by the upturned portion 20<sup>a</sup> and the upturned ends 22<sup>b</sup> of the rods 22. The frictional engagement of the sleeve 18 with the rod 20 is such as to maintain the gripping or engagement of the drum as long as desired. Should it be desired to change the angle of the drum, the wing nut 15 is slightly loosened, after which the drum may be rotated to the desired position and the wing nut 15 tightened to hold it in proper position.

After removal of the drum from the bracket, the rod 13 may be withdrawn from the clamp, the wing nut 15 released to permit removal of the bracket 17, the rods 22 swung around to lie adjacent the arm 20, the whole structure thereby permitting a compact packing or carrying, a convenience to drummers who find it necessary to move their apparatus from time to time.

The double washer 16, when made of flexible metal as steel, acts as a lock washer and the wing nut 15 may be so adjusted as to permit movement of the bracket 17 and drum without rotation of the wing nut 15 being caused thereby. This enables the drummer to instantly adjust the bracket and drum without operating the wing nut 15.

It will be obvious that my invention is susceptible of numerous modifications and improvements and I do not wish to be restricted to the form shown except as defined in the appended claims.

What I claim is:—

1. In a device of the class described, a clamping member, a rod engaging member carried thereby, a rod engaged by said member and slidable therethrough in a direction parallel to said clamping member, a second clamping member carried by said rod, a bracket, trap drum engaging arms carried by said bracket, and a flange depending therefrom and engageable by said second clamping member and adjustable therein in a direction at right angles to said rod.

2. In a device of the class described, a bracket, adjustable trap drum engaging arms carried thereby, one of said arms being frictionally retained in adjusted position thereon, a main clamping member, a rod carried thereby, a second clamping member secured to said rod, and a flange depending from said bracket and engaged by said second clamping member, said main clamping member permitting the adjustment of said drum engaging means in a direction parallel to said rod, and in a direction at right angles to said rod.

3. In a device of the class described, a clamping member, a rod-holding member secured thereto, a rod engaged by said rod-holding member and slidable therethrough in a direction parallel with said clamping member, a bracket adjustably secured to said rod, and trap drum engaging means adjustably mounted on said bracket.

4. In a device of the class described, a clamping member, a rod-supporting member carried thereby, a rod adjustably secured by said rod-supporting member, a bracket, adjustable trap drum engaging means secured thereto, said means comprising a pair of pivoted arms and a third arm slidable in a direction parallel to said rod, a depending flange carried by said bracket, and means carried by said rod for adjustably engaging said flange.

5. In a device of the class described, a clamping member, a rod mounted thereon and slidable in a substantially parallel direction relative to said clamping member, a bracket supported by said rod and adjustable thereon, and drum-engaging means mounted on said bracket.

In testimony whereof, I have subscribed my name.

LAWRENCE A. MUELLER.